United States Patent [19]

Isaac

[11] Patent Number: 5,749,119
[45] Date of Patent: May 12, 1998

[54] WINDSHIELD WIPER BLADE DEICER

[76] Inventor: Amos Isaac, 139-34 231st St., Laurelton, N.Y. 11413

[21] Appl. No.: 843,575

[22] Filed: Apr. 16, 1997

[51] Int. Cl.6 .................. B60S 1/04; B60S 1/32
[52] U.S. Cl. ........................................ 15/250.19
[58] Field of Search ..................... 15/250.19, 250.16, 15/250.17, 250.001, 250.34, 250.351, 250.202, 250.3, 250.21

[56] References Cited

U.S. PATENT DOCUMENTS

| | | | |
|---|---|---|---|
| 2,306,980 | 12/1942 | Roberts | 15/250.19 |
| 2,717,408 | 9/1955 | Le Page | 15/250.19 |
| 5,469,595 | 11/1995 | Dara | 15/250.19 |
| 5,487,204 | 1/1996 | Nelson | 15/250.19 |
| 5,551,116 | 9/1996 | DeKelaita | 15/250.19 |
| 5,636,407 | 6/1997 | Len | 15/250.19 |

FOREIGN PATENT DOCUMENTS

| | | | |
|---|---|---|---|
| 99234 | 6/1982 | Japan | 15/250.19 |
| 195160 | 8/1989 | Japan | 15/250.19 |
| 692203 | 4/1994 | Japan | 15/250.19 |

*Primary Examiner*—Gary K. Graham
*Attorney, Agent, or Firm*—Michael I. Kroll

[57] ABSTRACT

A windshield wiper blade deicer (22) comprising an assembly (24) for lifting and lowering two spring biased wiper arms (12) of a pair of windshield wipers (10) repeatedly with respect to a windshield (16) of a motor vehicle (18). Snow, ice and slush (20) will be loosened and knocked off two windshield wiper blades (14) and the windshield (16) of the motor vehicle (18) to increase visibility for a driver of the motor vehicle (18).

9 Claims, 4 Drawing Sheets

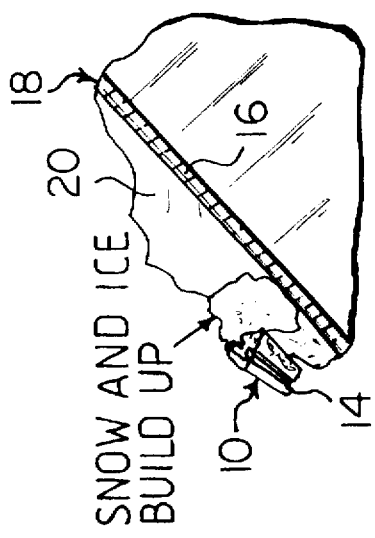
Fig. 2
(PRIOR ART)
Fig. 3
(PRIOR ART)
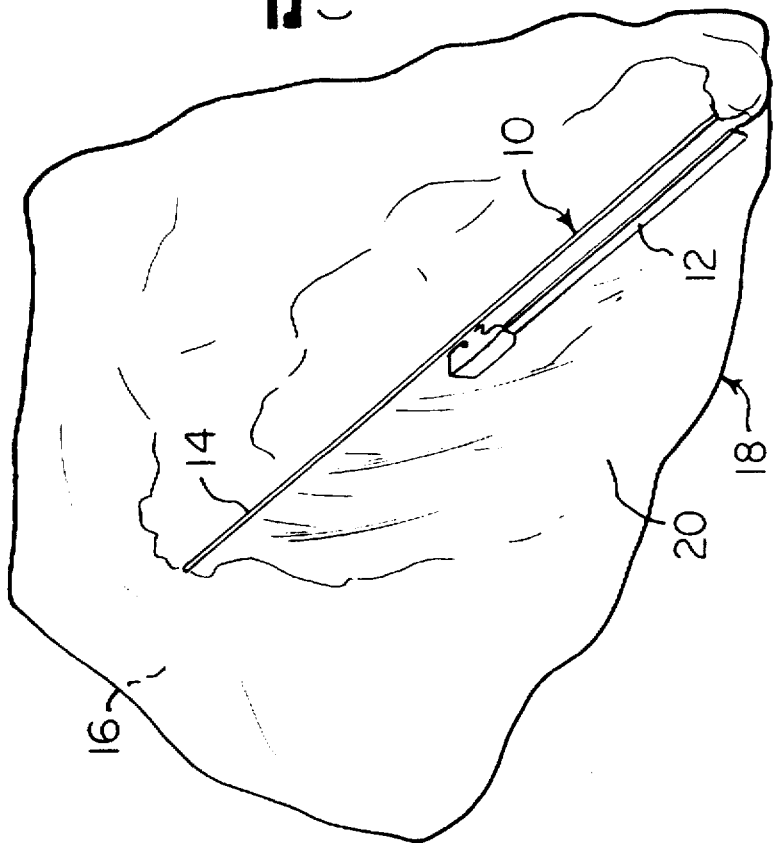

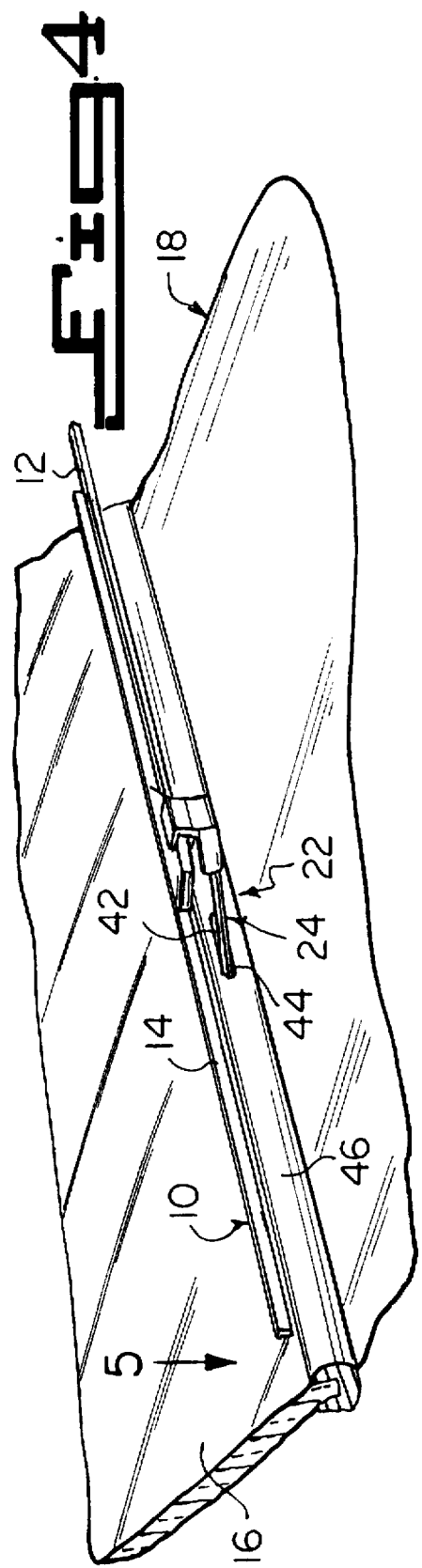

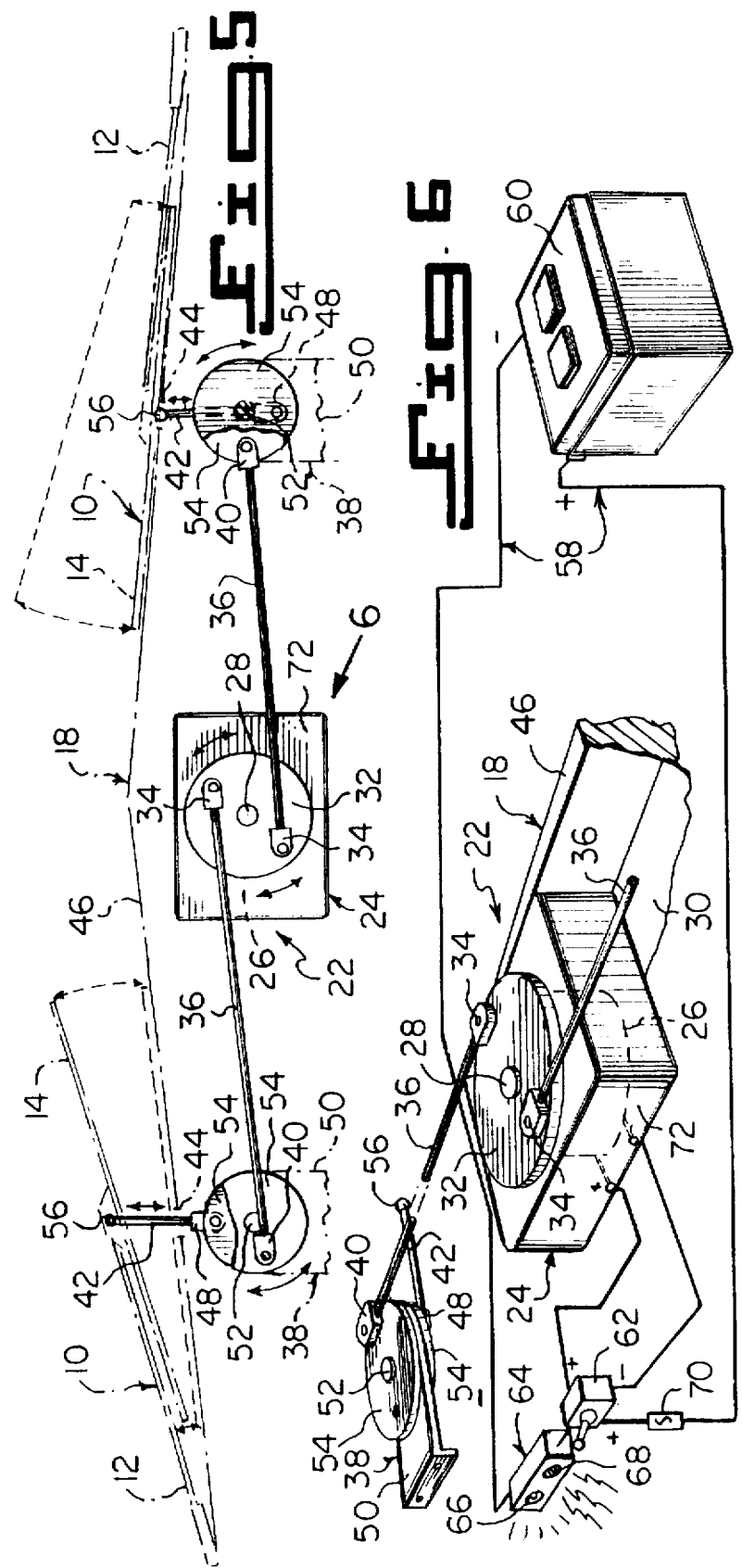

WINDSHIELD WIPER BLADE DEICER

BACKGROUND OF THE INVENTION

1. Field of the Invention

The instant invention relates generally to windshield wiper cleaning devices and more specifically it relates to a windshield wiper blade deicer. The windshield wiper blade deicer will push a spring loaded windshield wiper arm away from a windshield and then allow the windshield wiper arm to spring back to loosen and knock off ice, snow and slush from a wiper blade and the windshield.

2. Description of the Prior Art

Numerous windshield wiper cleaning devices have been provided in prior art. For example, U.S. Pat. No. 2,306,980 to Roberts; U. S. Pat. No. 5,469,595 to Dara; U. S. Pat. No. 5,487,204 to Nelson and U. S. Pat. No. 5,551,116 to DeKelaita all are illustrative of such prior art. While these units may be suitable for the particular purpose to which they address, they would not be as suitable for the purposes of the present invention as heretofore described.

ROBERT, LESLIE H.

WINDSHIELD WIPER BLADE CLEANING DEVICE

U.S. Pat. No. 2,306,980

A windshield wiper blade cleaning device comprising a base plate. A means is to secure the same in close relation to a rockable windshield wiper arm. A member is hingedly connected to the plate and extends into the rocking path of the wiper arm. A means on the plate is to retain the member from rocking when contacted by the arm in one direction of movement. The side of the member is contacted by the arm in the direction sloping in a direction upward to permit the arm to slide thereover as a raising means for the arm. A means on the plate is to permit the member to rock out of the path of the wiper arm when the arm rocks in the opposite direction. A spring means is to return the member into the rocking path of the wiper arm when the arm has left the member.

DARA CHESTER P.

WINDSHIELD WIPER BLADE SLAPPER APPARATUS

U.S. Pat. No. 5,469,595

A windshield wiper assembly produces an automatic lifting and snapping action of an oscillating wiper arm to slap a wiper blade against a windshield of an automobile when an initiator arm is in an engagement position. The wiper arm is pivoted on a wiper base when a bell crank, which is connected to the wiper base, engages the initiator arm. When the wiper base oscillates in a first direction across the initiator arm, the bell crank pushes a lever, which in turn raises the tension vector from a spring connected between first and second tension points in the wiper arm above the pivot point and the wiper arm is lifted from the windshield. When the wiper base oscillates in an opposite direction over the initiator arm, the bell crank lowers the lever, which in turn lowers the tension vector below the pivotal connection and slaps the wiper arm back toward the windshield. The initiator arm may be continuously placed into the engagement position to cause a repeating slapping action, or it may be controllably swung into the engagement position at predetermined intervals to provide an occasional slapping action of the wiper against the windshield.

NELSON, STEVEN M.

WINDSHIELD WIPER WITH DEICER

U.S. Pat. No. 5,487,204

A windshield wiper assembly including a wiper deicer for eliminating the build-up of snow and ice on a windshield wiper blade thereof. The assembly comprising a first support bracket secured to the windshield wiper. A second support bracket has a spline thereon. A support rod has a first end secured to the first support bracket. A hollow electrical solenoid casing receives a second end of the support rod. A wiper seal and scraper is secured within the casing adjacent the second end of the support rod. A pivot rod is pivotally secured to the second support bracket. An electrical solenoid is secured within the hollow electrical solenoid casing. The electrical solenoid is secured to the second end of the support rod. A wire is electrically secured to the solenoid and extends outwardly thereof to a push button mechanism. Power may be applied to the device by other sources such as an air cylinder as for vehicles with diesel engines, whether a truck, bus or the like.

DeKELAITA, NERGAL

DEVICE TO REFRESH WIPERS IN USE

U.S. Pat. No. 5,551,116

A ramp rotatably attached to a base attached to a vehicle windshield has an inactive state in which a wear block is attached to the arm which carries the wiper over the windshield passes over the ramp without touching the ramp. The ramp also has an active state in which the wear block rides up the ramp whereby the wiper is lifted off of the windshield, so that the arm then returns the wiper to the windshield with a jolt causing debris to leave the wiper. A remotely locatable electromagnetic solenoid actuates the ramp into the active state and frees the ramp to be returned to the inactive state by a return spring. The solenoid is controllable from within the vehicle.

SUMMARY OF THE INVENTION

A primary object of the present invention is to provide a windshield wiper blade deicer that will overcome the shortcomings of the prior art devices.

Another object is to provide a windshield wiper blade deicer that will enable a driver of a motor vehicle to keep the windshield wiper blades free of ice, snow and slush, thereby increasing visibility for the driver.

An additional object is to provide a windshield wiper blade deicer in which when driving in blizzards, many drivers are reluctant to get out of their motor vehicles to clean the wiper blades, whereby the instant invention would make this situation unnecessary.

A further object is to provide a windshield wiper blade deicer that is simple and easy to use.

A still further object is to provide a windshield wiper blade deicer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 2 is a cross sectional view of the prior art taken along line 2—2 in FIG. 1.

FIG. 3 is an enlarged front perspective view of the prior art, as indicated by arrow 3 in FIG. 1.

FIG. 4 is a front perspective view of a portion of a motor vehicle with a portion of the instant invention installed therein.

FIG. 5 is a diagrammatic top view taken generally in the direction of arrow 5 in FIG. 4, with parts shown in phantom, broken away and in section.

FIG. 6 is a diagrammatic perspective view taken in the direction of arrow 6 in FIG. 5, with additional parts broken away and in section, showing an electrical circuit for the instant invention.

Similar reference characters denote corresponding features consistently throughout the attached drawings.

DETAILED DESCRIPTION OF THE PREFERRED EMBODIMENTS

Figure 1:
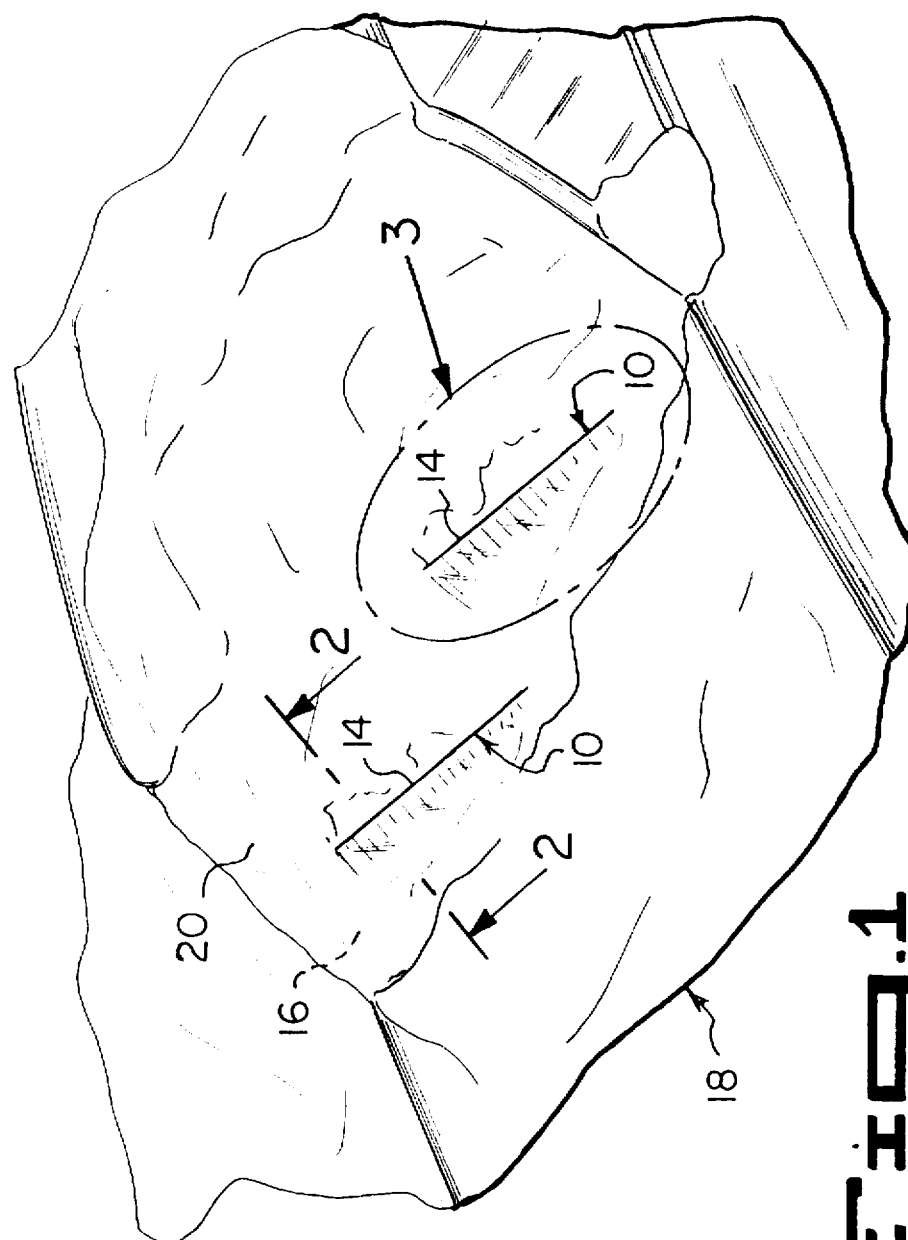
FIG. 1 is a front perspective view of a portion of a motor vehicle, showing the prior art being windshield wiper blades having snow, ice and slush build-up on the windshield.

Turning now descriptively to the drawings, in which similar reference characters denote similar elements throughout the several views, FIGS. 1, 2 and 3 illustrate the prior art in which a pair of windshield wipers 10 each have a spring biased wiper arm 12 and a windshield wiper blade 14 on a windshield 16 of a motor vehicle 18 and covered with snow, ice and slush 20.

The instant invention as shown in FIGS. 4, 5 and 6, is a windshield wiper blade deicer 22 comprising an assembly 24 for lifting and lowering the two spring biased wiper arms 12 of the pair of windshield wipers 10 repeatedly with respect to the windshield 16 of the motor vehicle 18. The snow, ice and slush 20 will be loosened and knocked off the two windshield wiper blades 14 and the windshield 16 of the motor vehicle 18, to crease visibility for a driver of the motor vehicle 18.

The lifting and lowering assembly 24 consists of an electric oscillating motor 26 having a shaft 28. The electric oscillating motor 26 is affixed onto a dashboard 30 adjacent the interior of the windshield 16 between the windshield wipers 10 on the exterior of the windshield 16 of the motor vehicle 18. A disc 32 is secured onto the shaft 28 of the electric oscillating motor 26. A first pair of pivot connectors 34 are provided, in which each pivot connector 34 is mounted oppositely onto the disc 32. A pair of elongated bars 36 are provided. Each elongated bar 36 is attached at a first end to one pivot connector 34. The elongated bars 36 will extend in opposite directions away from the electric oscillating motor 26.

A pair of oscillator brackets 38 are provided. Each oscillator bracket 38 is attached onto the dashboard 30 adjacent the interior of the windshield 16 behind one windshield wiper 10 on the exterior of the windshield 16 of the motor vehicle 18. A second pair of pivot connectors 40 are provided. Each pivot connector 40 is attached to a second end of one elongated bar 36 and one oscillator bracket 38. A pair of push rods 42 are provided. Each push rod 42 extends through an aperture 44 in a lower portion of a frame 46 of the windshield 16, to make contact with one spring biased wiper arm 12 of one windshield wiper 10.

A third pair of pivot connectors 48 are also provided. Each pivot connector 48 is attached to an inner end of one push rod 42 and one oscillator bracket 38. When the electric oscillating motor 26 is turned on the elongated bars 36 will oscillate the oscillator bracket 38, to move the push rods 42 in and out through the apertures 44 in the lower portion of the frame 46 of the windshield 16, to lift and lower the spring biased wiper arms 12 of the windshield wipers 10.

Each oscillator bracket 38 includes a support member 50. A stub shaft 52 extends through the support member 50. A pair of circular plates 54 are provided. Each circular plate 54 is mounted onto opposite ends of the stub shaft 52. One of the second pair of pivot connectors 40 is attached to one circular plate 54, while one of the third pair of pivot connectors 48 is attached to the other circular plate 54. Each push rod 42 contains a circular head 56 on an outer end thereof, to make a smooth and proper contact with one spring biased wiper arm 12 of one windshield wiper 10.

An electric circuit 58 is shown in FIG. 6, extending between a battery 60 of the motor vehicle 18 and the electric oscillating motor 26, so that the electric oscillating motor 26 can be powered by the battery 60. A delay switch 62 is electrically connected to the electric circuit 58. An alarm system 64 is electrically connected to the electric circuit 58. When the delay switch 62 is turned on, the alarm system 64 will indicate a three second warning and the electric oscillating motor 26 will operate for eight seconds. The alarm system 64 includes a lamp 66 electrically connected thereto, to give a visual three second warning when the delay switch 62 is turned on. The alarm system 64 also includes a speaker 68 electrically connected thereto, to give an audible three second warning when the delay switch 62 is turned on.

A fuse 70 is electrically connected to the electric circuit 58 between the battery 60 and the delay switch 62, so as to protect the electric circuit 58 from shorting out and damaging the electric oscillating motor 26. The electric oscillating motor 26 is retained within a casing 72 with the shaft 28 extending through the top of the casing and the disc 32 secured onto the shaft 28.

LIST OF REFERENCE NUMBERS 10 windshield wiper (prior art)
12 spring biased wiper arm of 10
14 windshield wiper blade of 10
16 windshield of 18
18 motor vehicle
20 snow, ice and slush
22 windshield wiper blade deicer
24 lifting and lowering assembly of 22
26 electric oscillating motor of 24
28 shaft of 26
30 dashboard of 18
32 disc of 24 on 26
34 first pivot connector of 24 on 32 for 36
36 elongated bar of 24

38 oscillator bracket of 24
40 second pivot connector of 24 on 38 for 36
42 push rod of 24
44 aperture in 46
46 frame of 16
48 third pivot connector of 24 on 38 for 42
50 support member of 38
52 stub shaft of 38 in 50
54 circular plate of 38 on 52
56 circular head on 42
58 electric circuit of 22
60 battery of 18
62 delay switch in 58
64 alarm system in 58
66 lamp in 64
68 speaker in 64
70 fuse in 58
72 casing for 26

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A windshield wiper blade deicer comprising means for lifting and lowering two spring biased wiper arms of a pair of windshield wipers repeatedly with respect to a windshield of a motor vehicle, so that snow, ice and slush will be loosened and knocked off two windshield wiper blades and the windshield of the motor vehicle to increase visibility for a driver of the motor vehicle, wherein said lifting and lowering means includes:

a) an electric oscillating motor having a shaft, said electric oscillating motor affixed onto a dashboard adjacent an interior of the windshield between the windshield wipers on an exterior of the windshield of the motor vehicle;

b) a disc secured onto said shaft of said electric oscillating motor;

c) a first pair of pivot connectors, in which each said pivot connector is mounted oppositely onto said disc;

d) a pair of elongated bars, in which each said elongated bar is attached at a first end to one said pivot connector, so that said elongated bars will extend in opposite directions away from said electric oscillating motor;

e) a pair of oscillator brackets, each said oscillator bracket attached onto the dashboard adjacent the interior of the windshield behind one windshield wiper on the exterior of the windshield of the motor vehicle;

f) a second pair of pivot connectors, in which each said pivot connector of said second pair is attached to a second end of one said elongated bar and one said oscillator bracket, respectively;

g) a pair of push rods, each said push rod extending through an aperture in a lower portion of a frame of the windshield to make contact with one spring biased wiper arm of one windshield wiper; and h) a third pair of pivot connectors, in which each said pivot connector of said third pair is attached to an inner end of one said push rod and one said oscillator bracket, respectively, so that when said electric oscillating motor is turned on said elongated bars will oscillate said oscillator bracket to move said push rods in and out through the apertures in the lower portion of the frame of the windshield, to lift and lower the spring biased wiper arms of the windshield wipers.

2. A windshield wiper blade deicer as recited in claim 1, wherein each said oscillator bracket includes:

a) a support member;

b) a stub shaft extending through said support member; and c) a pair of circular plates in which each said circular plate is mounted onto opposite ends of said stub shaft, so that one of said second pair of pivot connectors is attached to one said circular plate, while one of said third pair of pivot connectors is attached to other said circular plate.

3. A windshield wiper blade deicer as recited in claim 2, wherein each said push rod includes a circular head on an outer end thereof to make a smooth and proper contact with one spring biased wiper arm of one windshield wiper.

4. A windshield wiper blade deicer as recited in claim 3, further including an electric circuit extending between a battery of the motor vehicle and said electric oscillating motor, so that said electric oscillating motor can be powered by the battery.

5. A windshield wiper blade deicer as recited in claim 4, further including:

a) a delay switch electrically connected to said electric circuit; and b) an alarm system electrically connected to said electric circuit, so that when said delay switch is turned on said alarm system will indicate a three second warning and said electric oscillating motor will operate for eight seconds.

6. A windshield wiper blade deicer as recited in claim 5, wherein said alarm system includes a lamp electrically connected thereto, to give a visual three second warning when said delay switch is turned on.

7. A windshield wiper blade deicer as recited in claim 6, wherein said alarm system includes a speaker electrically connected thereto, to give an audible three second warning when said delay switch is turned on.

8. A windshield wiper blade deicer as recited in claim 7, further including a fuse electrically connected to said electric circuit between the battery and said delay switch, so as to protect said electric circuit from shorting out and damaging said electric oscillating motor.

9. A windshield wiper blade deicer as recited in Claim 8, wherein said electric oscillating motor is retained within a casing with said shaft extending through the top of said casing and said disc secured onto said shaft.

* * * * *